United States Patent [19]

Wideman et al.

[11] Patent Number: 5,194,513

[45] Date of Patent: Mar. 16, 1993

[54] RUBBER COMPOSITIONS CONTAINING A HYDROXY ARYL SUBSTITUTED MALEAMIC ACID

[75] Inventors: Lawson G. Wideman; Paul H. Sandstrom, both of Tallmadge; George F. Balogh, N. Canton; Denise J. Keith, Akron, all of Ohio

[73] Assignee: The Goodyear Tire & Rubber Company, Arkon, Ohio

[21] Appl. No.: 783,451

[22] Filed: Oct. 24, 1991

Related U.S. Application Data

[63] Continuation of Ser. No. 573,619, Aug. 28, 1990, abandoned.

[51] Int. Cl.$^5$ .................... C08C 19/20; C08C 19/22
[52] U.S. Cl. ..................... 525/329.3; 525/331.1; 525/331.8; 525/332.7; 525/340; 525/375
[58] Field of Search ............... 525/329.3, 331.8, 332.7, 525/331.1

[56] References Cited

U.S. PATENT DOCUMENTS

| | | | |
|---|---|---|---|
| 1,444,865 | 9/1921 | Bradley | 525/346 |
| 1,797,196 | 3/1931 | Clifford | 525/346 |
| 3,839,303 | 10/1974 | D'Amico | 525/346 |
| 4,433,114 | 2/1984 | Coran | 525/332.6 |

*Primary Examiner*—Christopher Henderson
*Attorney, Agent, or Firm*—Bruce J. Hendricks

[57] ABSTRACT

The present invenion relates to rubber compositions containing a hydroxy-aryl substituted maleamic acid. The rubbers modified with the hydroxy-aryl substituted maleamic acid exhibit improved rubber/filler interaction. The hydroxy-aryl substituted maleamic acid may also be used as a replacement for resorcinol in rubber compositions and function as a methylene acceptor for reaction with conventional methylene donors.

11 Claims, No Drawings

RUBBER COMPOSITIONS CONTAINING A HYDROXY ARYL SUBSTITUTED MALEAMIC ACID

This is a continuation of application Ser. No. 07/573,619 filed Aug. 28, 1990, now abandoned.

BACKGROUND OF THE INVENTION

A pneumatic tire is a polymeric composite and is a complex system of interacting components, each with specific properties for maximum effectiveness. One of the more important components of a tire is the tread. Since the tread of a tire comes into contact with the road, it is particularly compounded with various fillers and rubbers for traction. For example, to achieve good traction in a tire tread, the tread stock should exhibit a low rebound for increased hysteresis. Since there is a continuing effort to improve the traction of the tread of a tire, any rubber composition which exhibits improved rebound is desired.

Aside from complicated compounding of certain components of a tire, a frequent problem in making a rubber composite is maintaining good adhesion between the rubber and the reinforcement. A conventional method in promoting the adhesion between the rubber and the reinforcement is to pretreat the reinforcing fiber with a mixture of a rubber latex and a phenol-formaldehyde condensation product wherein the phenol is almost always resorcinol. This is the so called "RFL" (resorcinol-formaldehyde-latex) method. An alternative method of promoting such adhesion is to generate the resin in-situ (in the vulcanized rubber/textile matrix) by compounding a vulcanizing rubber stock composition with the phenol/formaldehyde condensation product (hereinafter referred to as the "in-situ method"). The components of the condensation product consist of a methylene acceptor and a methylene donor. The most common methylene donors include N-(substituted oxymethyl) melamine, hexamethylenetetramine or hexamethoxymethylmelamine. A common methylene acceptor is a dihydroxybenzene compound such as resorcinol. The in situ method has been found to be particularly effective where the reinforcing material is steel wire since pretreatment of the wire with the RFL system has been observed to be largely ineffective.

Resorcinol is known to form a resin network within a rubbery polymer by reacting with various methylene donors. Unfortunately, the use of resorcinol has some inherent disadvantages. Resorcinol is not readily dispersed in rubber and in fact neither the resin, nor the resorcinol become chemically bound to the rubber. Additionally, resorcinol in its raw form is excessively volatile and is potentially toxic, thus posing a health hazard. Another disadvantage in using resorcinol is periodic market shortages of supply.

There have been numerous attempts to replace resorcinol, however, few if any have had much success. For example, in U.S. Pat. No. 4,605,696 there is disclosed a method for enhancing adhesion of rubber to reinforcing materials through the use of phenolic esters as the methylene acceptor. These phenolic esters are less volatile than resorcinol, but still offer no readily reactive site for chemically attaching the resin to the rubber.

Therefore, there exists a need to find a suitable replacement for resorcinol in an in-situ resin system while concomitantly improving rubber/reinforcement interaction for increased adhesion and tear in rubber.

SUMMARY OF THE INVENTION

The present invention relates to a vulcanized rubber composition comprising a sulfur vulcanized rubber and from about 0.1 phr to about 10 phr of a hydroxy-aryl substituted maleamic acid of the formula:

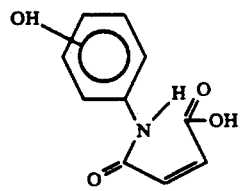

In addition the present invention relates to a vulcanizable rubber composition comprising a sulfur vulcanizable rubber, a vulcanizing agent and the reaction product of (a) a methylene donor and (b) a methylene acceptor which is a hydroxy-aryl substituted maleamic acid as defined above.

DETAILED DESCRIPTION OF THE PREFERRED EMBODIMENT

In accordance with an embodiment of the present invention, the level of hydroxy-substituted maleamic acid in the rubber may vary. For example, the level of hydroxy-aryl substituted maleamic acid may range from about 0.1 to about 10 parts by weight per 100 parts of rubber (also referred to herein as phr). Preferably, the level of hydroxy-aryl substituted maleamic acid ranges from about 0.5 to about 5 phr.

The present invention relates to the incorporation of a hydroxy aryl substituted maleamic acid in sulfur vulcanized rubber. One advantage of the present invention is the hydroxy aryl substituted maleamic acid exhibits low volatility and resembles the reactivity of resorcinol in the in-situ resin method. The hydroxy aryl substituted maleamic acid also possess the maleamic "tail" for attachment to the diene polymer.

In accordance with another embodiment, the present invention relates to a vulcanizable rubber composition comprising: (1) a natural and/or synthetic rubber, (2) a sulfur vulcanizing agent, (3) from about 0.5 to about 10 phr of a methylene donor, and (4) from about 0.5 to about 10 phr of a hydroxy aryl substituted maleamic acid represented by the formula:

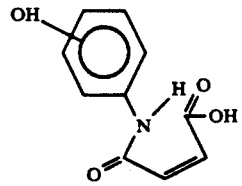

For purposes of the present invention, the compounds of the above formula are used as the methylene acceptor. The term "methylene acceptor" is known to those skilled in the art and is used to describe the reactant to which the methylene donor reacts to form what is believed to be a methylol monomer. The condensation of the methylol monomer by the formation of a methylene bridge produces the resin. The initial reactant that contributes the moiety that later forms into the methylene bridge is the methylene donor wherein the other reactant is the methylene acceptor.

Representative of the compounds of the above formula are N-(3-hydroxyphenyl) maleamic acid (3-HPMA) and N-(4-hydroxyphenyl) maleamic acid (4-HPMA).

The weight ratio of the methylene donor to the maleamic acid may vary. For example, the weight ratio may range from about 1:10 to 10:1. Preferably, the weight ratio will range from about 3:1 to 1:3.

The combination of the hydroxy-aryl substituted maleamic acid with a methylene donor improves the properties of "sulfur vulcanizable elastomers or rubbers". The term "sulfur vulcanizable elastomer or rubber" as used herein embraces both natural and all its various raw and reclaim forms as well as various synthetic rubbers. Representative synthetic polymers include the homopolymerization products of butadiene and its homologues and derivatives, as for example, methyl-butadiene, dimethylbutadiene and pentadiene as well as copolymers such as those formed from butadiene or its homologues or derivatives with other unsaturated organic compounds. Among the latter are acetylenes, for example, vinyl acetylene: olefins, for example, isobutylene, which copolymerizes with isoprene to form butyl rubber: vinyl compounds, for example, acrylic acid, acrylonitrile (which polymerizes with butadiene to form NBR), methacrylic acid and styrene, the latter polymerizing with butadiene to form SBR, as well as vinyl esters and various unsaturated aldehydes, ketones and ethers, e.g. acrolein, methyl isopropenyl ketone and vinylethyl ether. Also included are the various synthetic rubbers prepared by the homopolymerization of isoprene and the copolymerization of isoprene and other diolefins in various unsaturated organic compounds. Also included are the synthetic rubbers such as 1,4-cis-polybutadiene and 1,4-cis-polyisoprene and similar synthetic rubbers.

Specific examples of synthetic rubbers include neoprene (polychloroprene), polybutadiene (including trans- and cis-1,4-polybutadiene), polyisoprene (including cis-1,4-polyisoprene), butyl rubber, copolymers of 1,3-butadiene or isoprene with monomers such as styrene, acrylonitrile and methyl methacrylate, as well as ethylene/propylene/diene monomer (EPDM) and in particular ethylene/propylene/dicyclopentadiene terpolymers. The preferred rubbers for use in the present invention are polybutadiene, polyisobutylene, EPDM, butadiene-styrene copolymers, cis,1,4-polyisoprene and polychloroprenes.

For purposes of the present invention, the term "sulfur vulcanized rubber" is used herein to describe the vulcanized reaction product of the above rubbers described for use in the sulfur vulcanizable elastomers or rubbers.

The vulcanizable rubber compositions of the present invention may contain a methylene donor. The term "methylene donor" is intended to mean a compound capable of reacting with the hydroxy aryl substituted maleamic acid and generate the resin in-situ.

Examples of methylene donors which are suitable for use in the present invention include hexamethylene tetramine, hexaethoxymethylmelamine, hexamethoxymethylmelamine, lauryloxymethylpyridinium chloride, ethoxymethylpyridinium chloride, trioxan hexamethoxymethylmelamine, the hydroxyl groups of which may be esterified or partly esterified, and polymers of formaldehyde such as paraformaldehyde. In addition, the methylene donors may be N-substituted oxymethylmelamines, of the general formula:

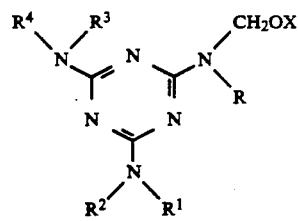

wherein X is an alkyl having 1 to 8 carbon atoms; R, $R_1$, $R_2$, $R_3$ and $R_4$ are individually selected from hydrogen, alkyl having from 1 to 8 carbon atoms, the group $-CH_2OX$ or their condensation products. Specific methylene donors include hezxakis(methoxymethyl) melamine, N,N',N''-trimethyl/N,N',N''-trimethylolmelamine, hexamethylolmelamine, N',N' -dimethylolmelamine, N-methylolmelamine, N,N'-dimethylolmelamine, N,N',N''tris(methoxymethyl) melamine and N,N',N''tributyl-N,N',N''-trimethylol-melamine. The N-methylol derivatives of melamine are prepared by known methods.

The weight ratio of methylene donor to the hydroxyl aryl substituted maleamic acid may vary. Generally speaking, the weight ratio will range from about 1:10 to about 10:1. Preferably, the weight ratio ranges from about 1:3 to 3:1.

The vulcanizable rubber composition of the present invention contains a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. The amount of sulfur vulcanizing agent will vary depending on the type of rubber and the particular type of sulfur vulcanizing agent that is used. Generally speaking, the amount of sulfur vulcanizing agent ranges from about 0.1 to about 5 phr with a range of from about 0.5 to about 2 being preferred.

The vulcanizable rubber composition for use in forming a composite with reinforcing material may be used in the manufacture of tires, belts or hoses. The vulcanizable rubber which is to be used to form the composite may contain conventional compounding ingredients such as carbon black, antidegradants, zinc oxide, accelerators, silica, processing and softening oils and the like.

The hydroxy aryl substituted maleamic acid may be compounded in either the productive or nonproductive stock. Preferably, the hydroxy aryl substituted maleamic acid is compounded in the nonproductive stock because more uniform mixing is generally achieved. Incorporation of the hydroxy aryl substituted maleamic acid into the sulfur vulcanizable rubber may be accomplished by conventional means of mixing such as by the use of a Banbury or Brabender.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert 0. Babbit (Norwalk, Conn., R. T. Vanderbilt Company, Inc., 978), pages 583-591. The use of this cure meter and standardized values read from the curve are specified in ASTM D-2084. A typical cure curve obtained on an oscillating disc rheometer is shown on page 588 of the 1978 edition of the Vanderbilt Rubber Handbook.

In such an oscillating disc rheometer, compounded rubber samples are subjected to an oscillating shearing action of constant amplitude. The torque of the oscillating disc embedded in the stock that is being tested is required to oscillate the rotor at the vulcanization temperature. The values obtained using this cure test are very significant since changes in the rubber or the compounding recipe are very readily detected. It is obvious that it is normally advantageous to have a fast cure rate.

Some of the following tables report cure properties that were determined from cure curves that were obtained for the various rubber formulations that were prepared. These properties include the total increase in torque (Delta Torque) and minutes to 90% of the torque increase (t90 min.).

Peel adhesion testing was done to determine the interfacial adhesion between various rubber formulations that were prepared. The interfacial adhesion was determined by pulling one compound away from another at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during curing and subsequent testing.

Adhesion to nylon was evaluated using the Tire Cord Adhesion Test (TCAT). Samples were prepared and tested according to the procedures described by D. W. Nicholson, D. I. Livingston, and G. S. Fielding-Russell, *Tire Science and Technology* (1978) 6, 114: G. S. Fielding-Russell and D. I. Livingston, *Rubber Chemistry and Technology* (1980) 53, 950: and R. L. Rongone, D. W. Nicholson and R. E. Payne, U.S. Pat. No. 4,095,465 (Jun. 20, 1978).

The following examples are presented in order to illustrate but not limit the present invention.

EXAMPLE 1

Preparation of N-(3-hydroxyphenyl)maleamic acid

A dry 3-liter 3-neck round bottom flask was fitted with a stirrer and thermocouple arrangement. The system was flushed with nitrogen and charged with 294 grams (3 moles) of maleic anhydride in 1200 ml of xylene. The maleic anhydride was heated with stirring at 50° C. to form a solution. 3-Aminophenol (330 g, 3.0 moles) was then slowly added neat to the solution with vigorous stirring over a period of about 5 minutes. The flask was again flushed with nitrogen and sealed under a nitrogen balloon. The flask was held at 50°-55° C. with vigorous stirring for 4 hours. At the end of 4 hours, the stirring was continued and the flask and contents were cooled with tap water/wet ice to 10° C. The bright yellow-colored slurry was readily poured out of the neck of the flask and vacuum filtered through a No. 4 filter paper to give a wet filter cake weighing 646 g. The product was dried at a temperature below 50° C. in a draft hood and yielded 548 g of dry product. The yellow product was a powder melting at 115° C. Specific gravity was 1.210. The desired product was confirmed by infrared (IR) and nmr analysis.

EXAMPLE 2

Preparation of N-(4-hydroxyphenyl)maleamic Acid

A dry 3-liter 3-neck round bottom flask was fitted with a stirrer and thermocouple arrangement. The system was flushed with nitrogen and charged with 196 g (2 moles) of maleic anhydride in 800 ml of xylene. The maleic anhydride was heated with stirring at 50° C. to form a solution. 4-Aminophenol (218 g, 2.0 moles) was then slowly added neat to the solution with vigorous stirring over a period of about 5 minutes. The reaction gave an exotherm that increased the pot temperature from about 54° to 71° C. The flask was again flushed with nitrogen and sealed under a nitrogen balloon. The flask was held at 50°-55° C. with vigorous stirring for 4 hours. At the end of 4 hours, the stirring was continued and the flask and contents were cooled with tap water/wet ice to 10° C. The green to bright yellow-colored slurry was readily poured out of the neck of the flask and vacuum filtered through a No. 4 filter paper to give a wet filter cake. The product was dried at a temperature below 50° C. in a draft hood to yield 330 grams of product. The yellow product is a powder melting at 150°-156° C. Specific gravity is 1.210. Infrared (IR) and nmr analysis were carried out and confirmed the desired product.

EXAMPLE 3

Physical Testing

Table I below shows the basic rubber compound that was used in this example. The rubber compound was prepared in a three-stage Banbury mix. All parts and percentages are by weight unless otherwise noted.

The various samples were prepared using the respective amount (phr) of resin components listed in Table II. The physical data for each sample is also listed in Table II.

TABLE I

| 1st Non-Productive | |
|---|---|
| Natural Rubber (#2 ribbed smoked sheet) | 100.0 |
| SAF Carbon Black | 15.0 |
| 2nd Non-Productive | |
| SAF Carbon Black | 35.0 |
| Processing Oil | 5.0 |
| Stearic Acid | 1.0 |
| Zinc Oxide | 5.0 |
| Antioxidant | 2.0 |
| N-(3-hydroxyphenyl)maleamic acid | Varied |
| N-(4-hydroxyphenyl)maleamic acid | Varied |
| Resorcinol | Varied |
| Productive | |
| Sulfur, Accelerator, Retarder | 3.2 |
| Hexamethoxymethyl Melamine | Varied |
| Hexamethylenetetramine | Varied |

TABLE II

| SAMPLE | A | B | C | D | E |
|---|---|---|---|---|---|
| Resorcinol | .75 | 1.5 | 0 | 0 | 0 |
| Hexamethylene tetramine | 1.5 | 0 | 0 | 1.5 | 0 |
| Hexamethoxymethyl melamine | 0 | 1.5 | 0 | 0 | 1.5 |
| N-(3-hydroxyphenyl)-maleamic acid | 0 | 0 | 2.0 | 1.5 | 3.0 |
| Rheometer, 150° C. | | | | | |
| Max. Torque | 48.6 | 43.7 | 42.8 | 50.5 | 43.9 |
| Min. Torque | 10.3 | 11.3 | 14.2 | 12.8 | 14.8 |
| Delta Torque | 38.3 | 32.4 | 28.6 | 37.7 | 29.1 |
| t90 (min.) | 13.6 | 20.3 | 18.7 | 15.1 | 20.3 |
| t25 (min.) | 8.9 | 12.0 | 11.4 | 8.9 | 11.4 |
| Stress Strain | | | | | |
| Tensile Strength, MPa | 22.3 | 19.6 | 21.0 | 22.7 | 20.9 |
| Elongation at Break, % | 424 | 438 | 496 | 423 | 464 |

TABLE II-continued

| SAMPLE | A | B | C | D | E |
|---|---|---|---|---|---|
| 300% Modulus, MPa | 16.0 | 13.3 | 12.0 | 16.6 | 13.0 |
| Zwick Rebound | | | | | |
| RT, % | 49.9 | 45.9 | 48.6 | 49.6 | 48.4 |
| 100° C., % | 61.4 | 53.5 | 56.3 | 59.9 | 56.6 |
| Adhesion (Newtons) | | | | | |
| Peel Adhesion to Itself | 134 | 184 | 252 | 142 | 177 |
| To Nylon Cord | 23.2 | 37.2 | 37.7 | 34.7 | 37.0 |
| Rheovibron | | | | | |
| E' @ 0° C. ($\times 10^{+7}$) | 34.1 | 39.2 | 47.4 | 38.5 | 37.9 |
| Tan Delta @ 0° C. | .098 | .101 | .097 | .095 | .104 |
| E' @ 60° C. ($\times 10^{+7}$) | 21.2 | 23.4 | 30.2 | 25.7 | 24.2 |
| Tan Delta @ 60° C. | .074 | .093 | .095 | .069 | .086 |
| Compression Modulus | | | | | |
| 10% Strain, pounds | 18 | 17 | 18 | 20 | 18 |
| 30% Strain, pounds | 50 | 46 | 47 | 57 | 47 |
| Pierced Groove Flex | | | | | |
| 100° C. (32nds/min.) | 30/240 | 10/240 | 8/240 | 18/240 | 9/240 |

The replacement of resorcinol with N-(3-hydroxyphenyl)-maleamic acid in combination with hexamethylenetetramine (Sample D) or hexamethoxymethyl melamine (Sample E) gives 300% modulus similar to the corresponding controls (Samples A and B). This indicates a resin formation as is normally associated with resorcinol and the amine compounds. The compounds containing N-(3-hydroxyphenyl)maleamic acid and the amine compounds (Samples D and E) also exhibit good adhesion to nylon and Flexten cords and also excellent pierced groove flex. The compound containing only N-(3-hydroxyphenyl)maleamic acid and no resin forming amine (Sample C) shows some unusual properties. This compounds exhibits lower high strain modulus (300%) but higher low strain modulus (Rheovibron) than the other samples tested. It also has the highest peel adhesion to itself, the best pierced groove flex and excellent adhesion to Nylon and Flexten cords. These unexpected results would seem to indicate that the N-(3-hydroxyphenyl)maleamic acid is reacting with the diene rubber in the cured compound.

EXAMPLE 4
Physical Testing

Table III below shows the basic rubber compound that was used in this example. The rubber compound was prepared in a two stage Banbury mixer. All parts and percentages are by weight unless otherwise noted.

The various samples were prepared using the respective amount (phr) of resin components listed in Table IV. The cure data as well as other physical data for each sample is also listed in Table IV.

TABLE III

| 1st Non-Productive | |
|---|---|
| Natural Rubber | 50 |
| SBR | 50 |
| Filler | 63.6 |
| Processing Oil | 19.5 |
| Stearic Acid | 2 |
| Zinc Oxide | 3.5 |
| Antioxidant | 2.95 |
| N-(3 or 4-hydroxyphenylmaleamic acid) | Varied |
| Productive | |
| Sulfur, Accelerator | 2.93 |
| Total | 194.48 |

TABLE IV

| Parts | 4-Hydroxyphenyl Maleamic Acid | | | Control | 3-Hydroxyphenyl Maleamic Acid | |
|---|---|---|---|---|---|---|
| | 1.0 | 2.0 | 4.0 | 0/Repeat[1] | 2.0 | 2.0[1] |
| Rheometer | | | | | | |
| Delta torque | 21.0 | 19.6 | 17.4 | 22.5/23.5 | 20.6 | 21.6 |
| T90 (min.) | 17.4 | 15.0 | 14.9 | 21.8/21.7 | 19.6 | 19.5 |
| Modulus (300%) | 7.4 | 6.8 | 5.6 | 8.5/07.8 | 7.2 | 7.2 |
| Tensile Strength | 16.8 | 16.1 | 15.2 | 17.4/17.4 | 16.4 | 16.5 |
| Elongation | 592 | 614 | 663 | 549/575 | 610 | 600 |
| Hardness | | | | | | |
| at RT | 56.8 | 57.8 | 57.6 | 56.0/53.4 | 59.0 | 57.0 |
| at 100° C. | 50.1 | 50.1 | 48.6 | 50.3/49.5 | 51.5 | 50.1 |
| Rebound | | | | | | |
| at RT | 48.9 | 48.7 | 47.1 | 50.9/51.8 | 48.2 | 50.8 |
| at 100° C. | 60.9 | 58.3 | 53.8 | 63.6/65.6 | 58.5 | 59.5 |
| Peel Adhesion | | | | | | |
| 32 min/150° C. | 165.0 | 180.2 | 226.1 | 104.2/106.7 | 170.9 | 152.7 |
| 54 min/150° C. | 143.8 | 170.5 | 232.3 | 109.8/092.4 | 139.4 | 133.0 |

[1]Note these two formulations were mixed in a separate study.

As can be seen from the above data, the present invention provides a reduced rebound for increased hysteresis and increased Peel adhesion while maintaining hardness values.

What is claimed is:

1. A vulcanizable rubber composition comprising a sulfur vulcanizable rubber, a vulcanizing agent and a methylene donor selected from the group consisting of (1) hexmethylene teramine, hexamethoxymethyl melamine, lauryloxymethyl pyridinium chloride, ethyloxymethyl pyridinium chloride, trioxan hexamethylolmelamine and paraformaldehyde (2) from the general formula:

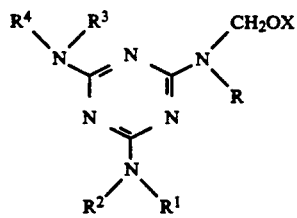

where X is an alkyl having from 1 to 8 carbon atoms, R, $R^1$, $R^2$, $R^3$, and $R^4$ and individually selected from the group consisting of hydrogen, an alkyl having from 1 to 8 carbon atoms, the group —$CH_2OX$ or their condensation products; and (3) hexakis(methoxymethyl)-melamine,N,N',N"-trismethyl/N,N',N"-trimethylol-melamine, hexamethylolmelamine,N,N',N"-dimethylolmelamine, N-methylolmelamine, N,N'-dimethylolmelamine, N,N',N"tris(methoxymethyl)melamine and N,N'N"tributyl-N,N',N"tributyl-N,N',N"-trimethylolmelamine; and (b) from about 0.1 to about 10 phr of a methylene acceptor which is a maleamic acid of the formula:

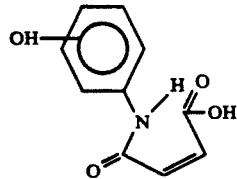

and the weight ratio of methylene donor to the maleamic acid ranges from 1:10 to 10:1.

2. The composition of claim 1 wherein the methylene acceptor is:

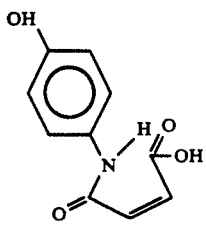

3. The composition of claim 1 wherein the methylene acceptor is:

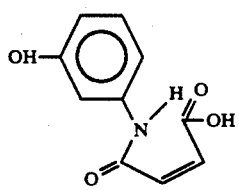

4. The composition of claim 1 wherein the rubber is selected from the group consisting of natural rubber, polychloroprene, polybutadiene, polyisoprene, butyl rubber, EPDM, styrene/butadiene copolymers, terpolymers of acrylonitrile, butadiene and styrene and blends thereof.

5. The composition of claim 1 wherein the methylene donor is selected from the group consisting of hexamethylene tetramine, hexamethoxymethyl melamine, lauryloxymethyl pyridinium chloride, ethyloxymethyl pyridinium chloride, trioxan hexamethylolmelamine and paraformaldehyde.

6. The composition according to claim 1 wherein the methylene donor is selected from the general formula:

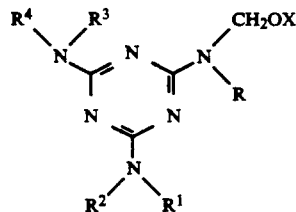

wherein X is an alkyl having from 1 to 8 carbon atoms, R, $R^1$, $R^2$, $R^3$ and $R^4$ are individually selected from the group consisting of hydrogen, an alkyl having from 1 to 8 carbon atoms, the group —$CH_2OX$ or their condensation products.

7. The composition of claim 1 wherein the methylene donor is selected from the group consisting of hexakis(methoxymethyl)melamine, N,N',N"-trimethyl/ N,N',N"-trimethylolmelamine, hexamethylolmelamine, N,N',N"-dimethylolmelamine, N-methylolmelamine, N,N'-dimethylolmelamine, N,N',N"tris(methoxymethyl) melamine and N,N',N"tributyl-N,N',N"-trimethylolmelamine.

8. The composition of claim 1 wherein the weight ratio of methylene donor to the maleamic acid may range from about 1:3 to about 3:1.

9. The composition of claim 1 wherein the sulfur vulcanizing agent is selected from the group consisting of elemental sulfur, an amine disulfide, polymeric polysulfide or sulfur olefin adduct.

10. The composition of claim 9 wherein the sulfur vulcanizing agent ranges from about 0.1 to about 5 phr.

11. The composition of claim 1 wherein the amount of the maleamic acid may range from about 0.5 to about 5.0 phr.

* * * * *